J. E. McLEOD.
FUMIGATOR AND POISON DISTRIBUTER.
APPLICATION FILED JULY 2, 1919.
1,355,489.
Patented Oct. 12, 1920.
4 SHEETS—SHEET 1.
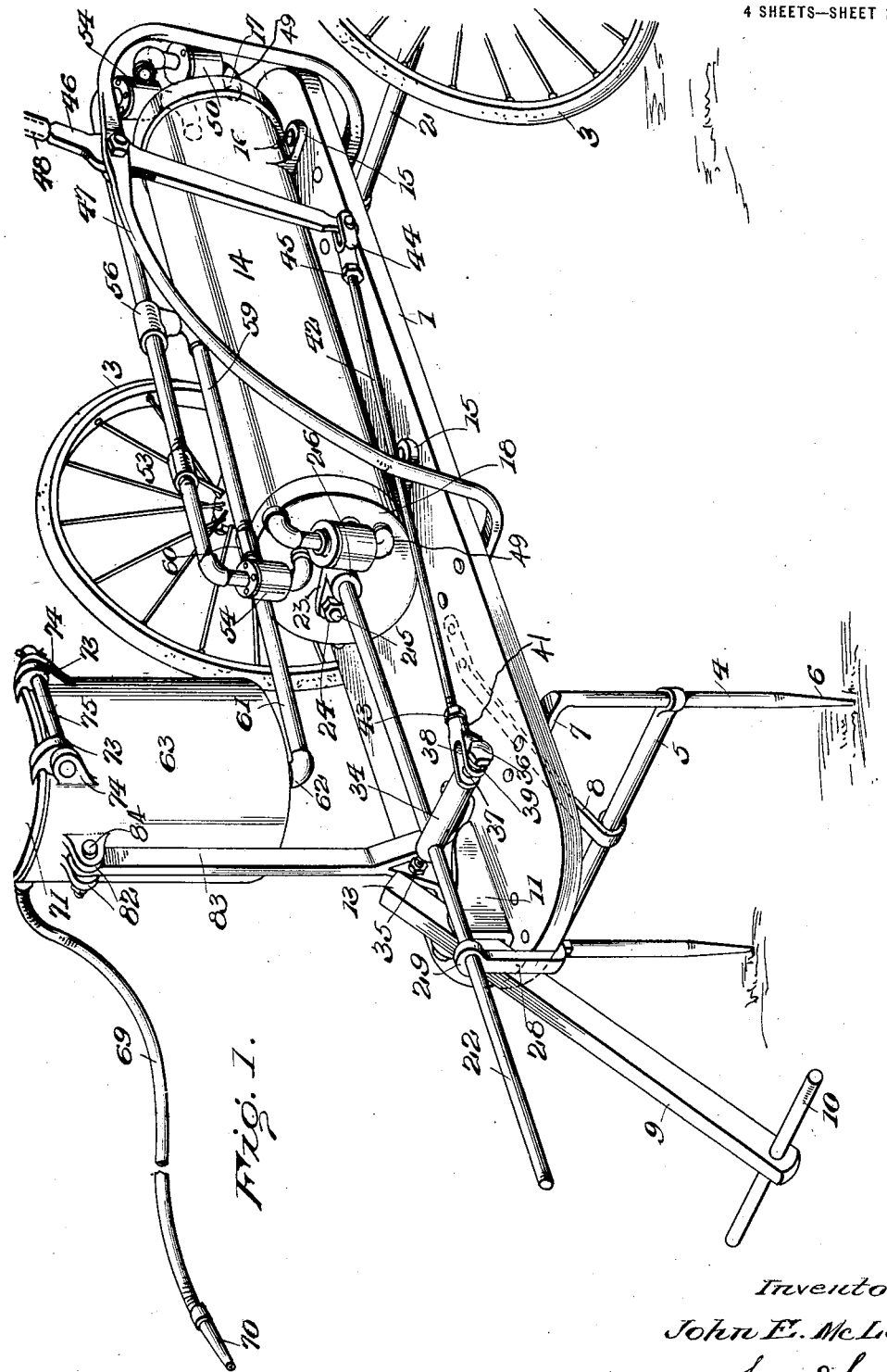
Fig. I.
Inventor:
John E. McLeod.
by, Lacey & Lacey,
his Attorneys.

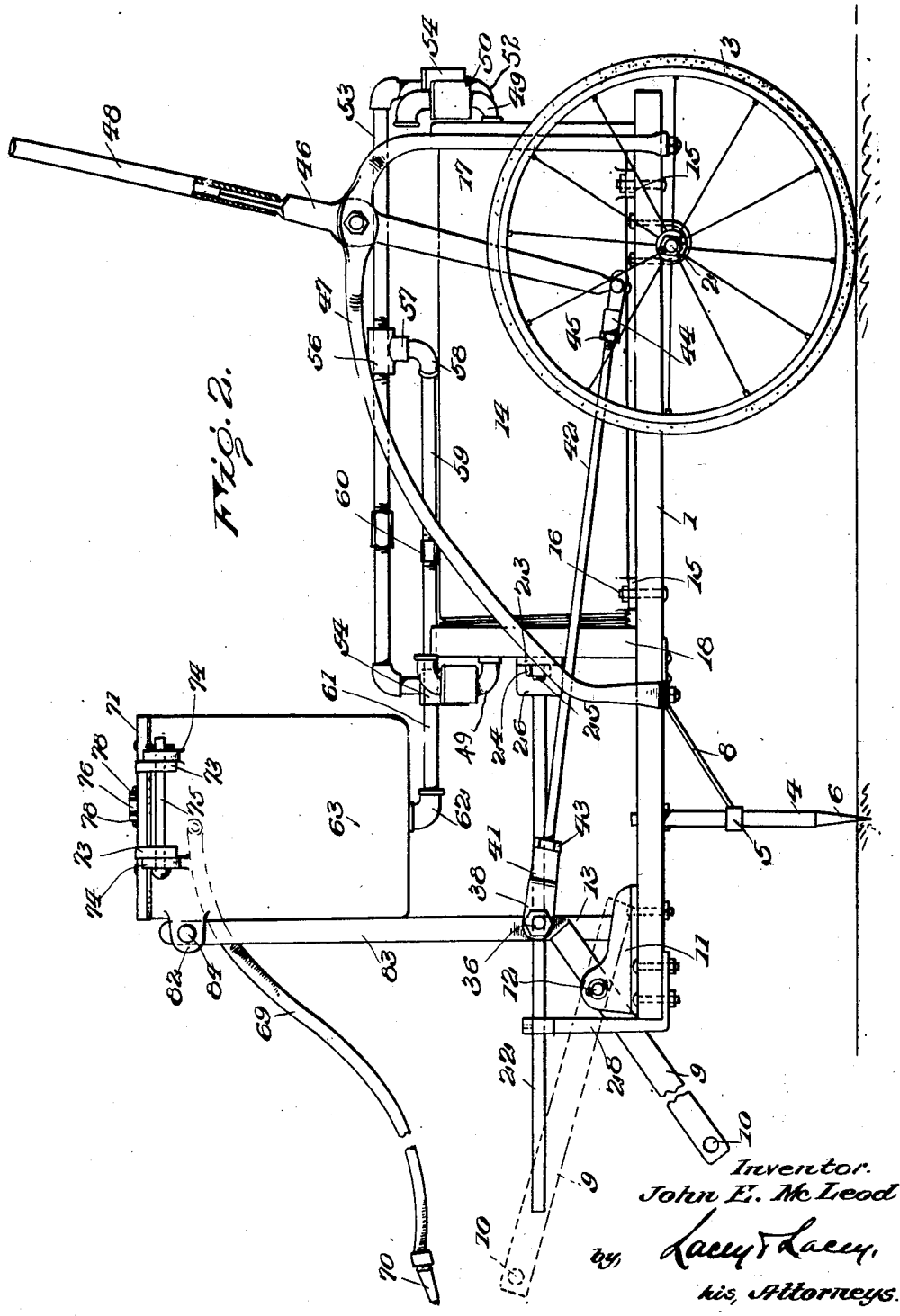

J. E. McLEOD.
FUMIGATOR AND POISON DISTRIBUTER.
APPLICATION FILED JULY 2, 1919.
1,355,489.
Patented Oct. 12, 1920.
4 SHEETS—SHEET 3.
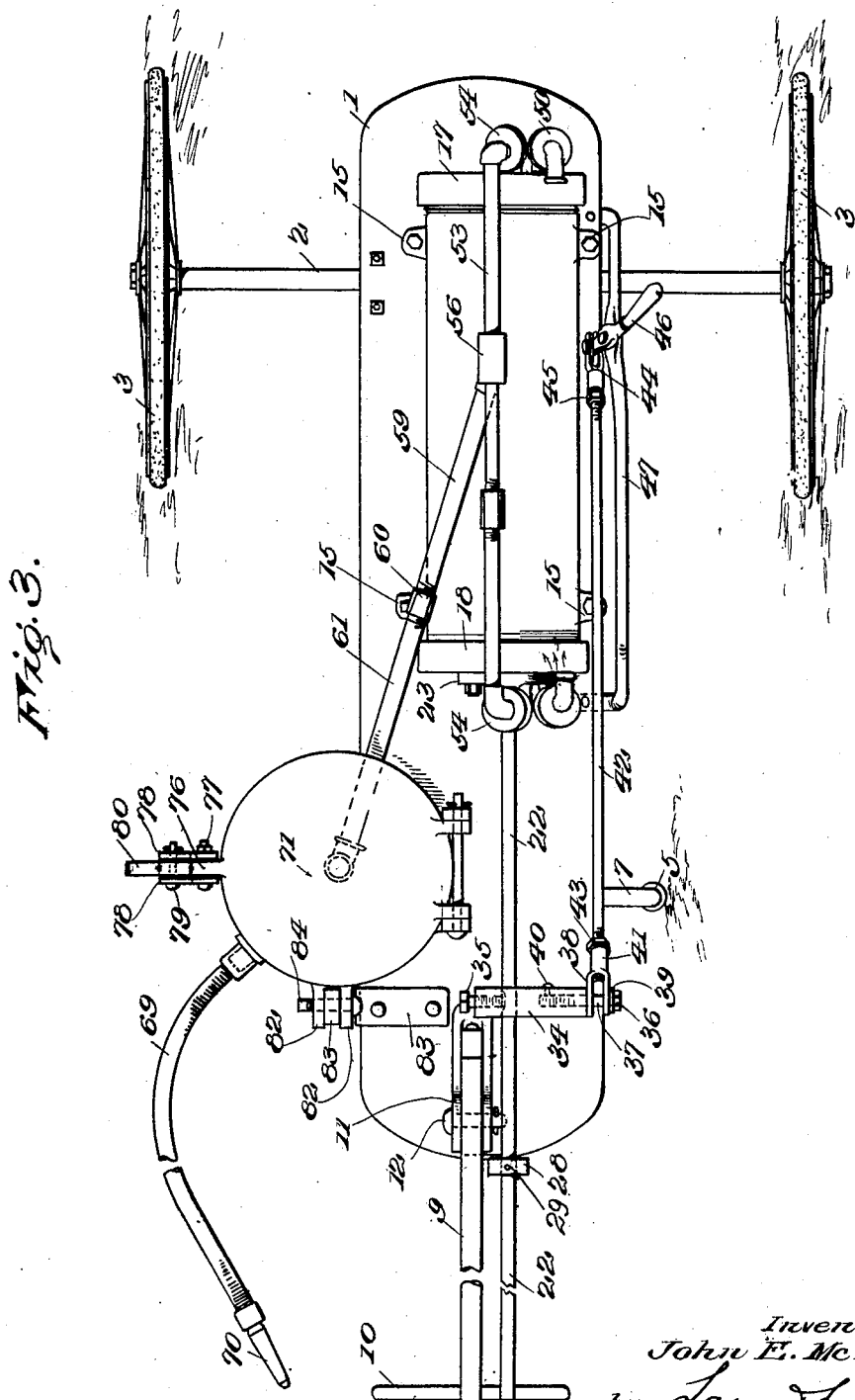

J. E. McLEOD.
FUMIGATOR AND POISON DISTRIBUTER.
APPLICATION FILED JULY 2, 1919.
1,355,489.
Patented Oct. 12, 1920.
4 SHEETS—SHEET 4.
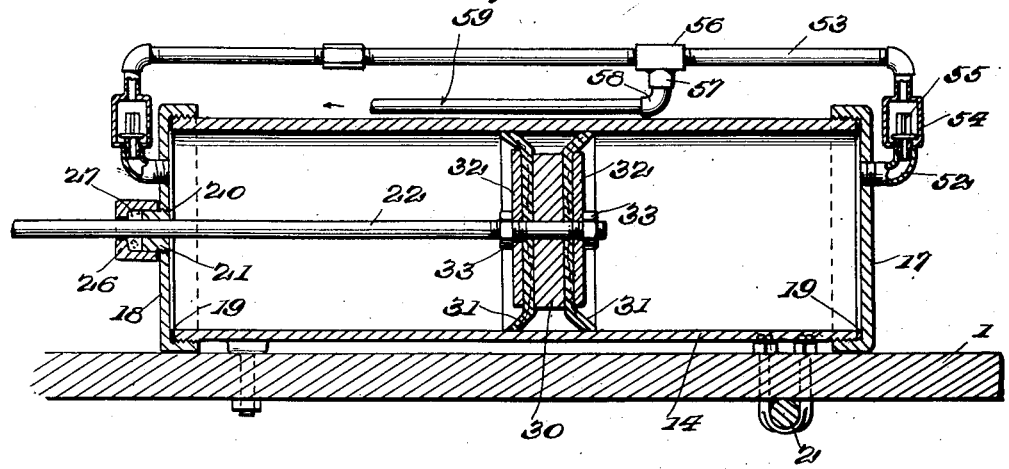
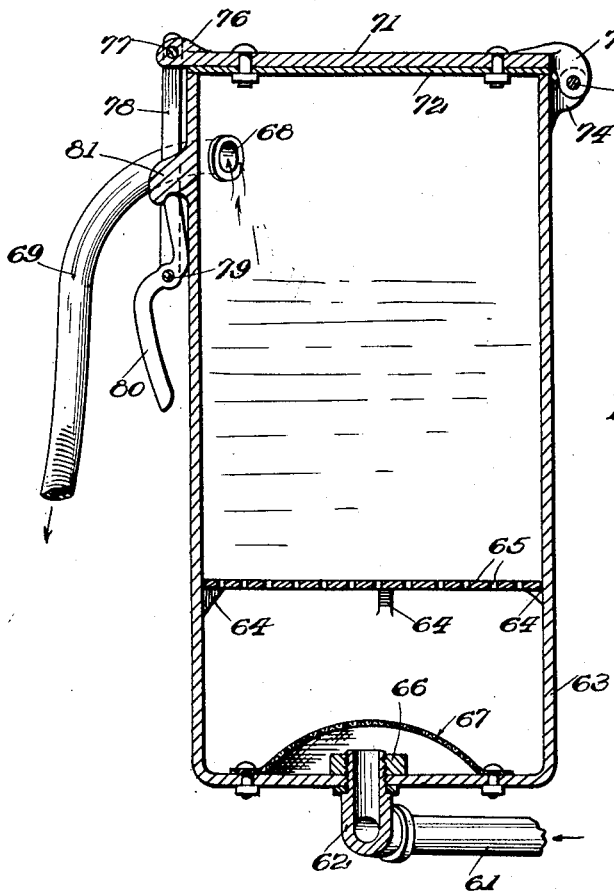
Inventor.
John E. McLeod
by Lacey & Lacey,
his Attorneys.

UNITED STATES PATENT OFFICE.

JOHN EARL McLEOD, OF WASHINGTON, KANSAS.

FUMIGATOR AND POISON-DISTRIBUTER.

1,355,489.　　　　　Specification of Letters Patent.　　Patented Oct. 12, 1920.

Application filed July 2, 1919. Serial No. 308,080.

*To all whom it may concern:*

Be it known that I, JOHN EARL MCLEOD, a citizen of the United States, residing at Washington in the county of Washington and State of Kansas, have invented certain new and useful Improvements in Fumigators and Poison-Distributers, of which the following is a specification.

The object of my invention is to provide an efficient mechanism which may be easily moved from place to place and operated to fumigate buildings and will be particularly adapted for use in applying to the runways of gophers, moles and other rodents, a poisonous gas which will quickly asphyxiate all animals and thereby rid the infested farm or other locality of the pests. The invention seeks to provide a mechanism whereby a retort or burner containing chemicals or other ingredients for producing the gas will be operatively connected with a pump or other means whereby a constant stream of air or other fluid will be forced into and through the burner or retort so that the poisonous gas will be carried out under pressure and may be delivered to the point where its use is desired. The stated objects of the invention and other objects which will incidentally appear in the course of the following description are attained in an apparatus of the general characteristics illustrated in the accompanying drawings and the invention resides in certain novel features which will be particularly pointed out in the claims following the description.

In the drawings—

Figure 1 is a perspective view of an apparatus embodying my invention;

Fig. 2 is a side elevation of the same;

Fig. 3 is a plan view thereof;

Fig. 4 is a longitudinal section through the pump;

Fig. 5 is a vertical section through the retort or burner.

In carrying out the invention, I employ a base-board 1 which is preferably oblong with curved ends, but it may, of course, be of any form and of any desired dimensions. To the under side of this base-board at one end thereof, I secure an axle 2 upon the ends of which are mounted ground wheels 3 whereby the machine may be readily moved from place to place. At the opposite end of the base-board, I secure to the under side thereof a support consisting of legs 4 connected by a cross-bar 5 and having tapered or pointed ends 6 whereby they will be easily driven into the ground. Preferably the upper ends of the legs are connected by a beam 7 which is bolted or otherwise rigidly secured to the base-board and a brace 8 is disposed between the cross bar 5 and the base-board in rear of the cross-bar and secured rigidly when placed so as to impart additional strength and rigidity to the structure. When the device is to be used, the legs are driven into the ground so that the machine will remain steady and practically free of vibration while in operation and the legs may be driven to a greater or less depth according to the nature of the soil as will be readily understood, penetrating the earth if necessary until the cross-bar or beam 5 bears upon the surface thereof. To facilitate the shifting of the device to the desired point of use, I provide a handle member or tongue 9 which is provided with a cross-bar 10 at its free end and is pivoted near its opposite end in a bracket 11 which is secured rigidly upon the base-board. This bracket is preferably a stirrup or staple substantially U-shaped in cross-section and secured rigidly upon the base-board by bolts or screws inserted through its lower member but it will be understood that any convenient form of spaced supports may be employed, the tongue 9 being secured in place by a pivot pin or bolt 12 inserted through the side members of the bracket or support and through the tongue at a point adjacent but not at the inner extremity thereof. The inner extremity 13 of the tongue may bear upon the base-board or the bottom member of the supporting bracket, as shown at dotted lines in Fig. 2, and the machine may thus be brought to a slightly tilting position resting upon the ground wheels 3 so that it may be easily moved over a field or from one point of use to another point of use.

Disposed longitudinally upon the base-board, nearer the wheeled end thereof, is a cylinder 14 constituting the body of an air pump. This cylinder is secured rigidly upon the base-board in any desired manner and is illustrated as provided with lugs or feet 15 through which bolts 16 are inserted to secure the device upon the base-board. The heads or ends 17 and 18 of the cylinder are threaded onto the same, as shown most clearly in Fig. 4, and packing 19 of any suitable material is interposed between the end edges of the cylinder and the heads so as to effect air-tight joints and prevent leakage. The head 17 is imperforate except for the inlet and outlet ports which will be presently particularly referred to, but the head 18 is provided centrally with a threaded opening, indicated at 20, in which is engaged a plug 21 forming a guide for the piston rod 22. A cap plate or bar 23 is fitted against the outer surface of the head 18 and secured thereto by nuts 24 fitting over studs 25 which are formed on the head and project through suitable openings in the ends of the bar 23. At the center of the said bar is formed a boss or collar 26 which fits around the piston rod 22 and between the end of said collar or boss and the outer end of the plug 21 packing 27 is interposed to prevent leakage around the piston rod. The bore of the collar, hub or boss 26 is smooth and the outer portion of the plug 21 is also smooth so that the said plug may be adjusted within the opening 20, to insure the proper compression of the packing 27 when the cap plate or bar is secured in position. The piston rod 22 extends beyond the hub or collar 26 and its outer portion is supported in and guided by a post or bracket 28 secured on the rear end of the base-board 1 and provided at its upper extremity with an eye through which the piston rod passes, as clearly shown in Fig. 1. In the upper side of the eye or guide an oil cup or opening 29 is provided so that lubricant may be admitted to the piston rod to prevent binding and excessive wear of the same in operation. The piston consists of a central ring 30 fitted upon the inner portion of the piston rod adjacent the extremity of the same, as clearly shown in Fig. 4. Against each face of the ring 30 is a flexible piston packing member or disk 31 which may be of leather, rubber or other suitable material and these flexible piston disks are held to the ring 30 by rings or washers 32 and nuts 33 mounted on the piston rod and bearing against the said washers. The washers and the ring 30 are of less diameter than the bore of the cylinder, but the disks 31 are of somewhat greater diameter than the bore of the cylinder so that their edges will be cupped or folded, as shown in Fig. 4, and in assembling the parts, the disks are so arranged that their edges will be cupped in opposite directions, the tops or mouths of the cups being disposed toward the opposite ends of the cylinder, as clearly shown in Fig. 4. Between the rear end of the cylinder and the post or support 28, I secure to the piston rod a laterally disposed arm or block 34 by means of a set screw 35 mounted in the end of the block and bearing against the side of the piston rod, as clearly shown in Fig. 3. In the outer end of the said block or arm, I mount a set screw 36 having an outer smooth portion 37 upon which is pivotally engaged the end of a clevis 38, a washer 39 being inserted between the head of the set screw and the outer side of the said clevis. To guard against outward movement of the set screw 36, under the frictional turning strain imparted thereto by the movement of the clevis 38, I provide a set screw 40 which is mounted in the side of the arm 34 and bears against the inner extremity of the screw 36. The clevis 38 has a tubular portion 41 which receives one end of a pitman 42 and a lock nut 43 is mounted on the said pitman and turned home against the end of the clevis so as to prevent separation of the parts. The forward end of the pitman 42 is connected by a clevis 44 and a lock nut 45 to the lower end of the operating lever 46 which is fulcrumed upon a bracket 47 secured to and rising from the base-board 1 at the side edge of the same. The lever 46 may be constructed in two sections so that the handle section 48 may be easily disengaged from the fulcrumed section when it is desired to transport the device or store the same.

Each head of the cylinder is constructed with an inlet and an outlet port and threaded into each inlet port is an inlet pipe 49 disposed vertically and having its upper end arranged above the cylinder and open. A valve chamber 50 is formed in the length of each pipe 49 and within the said valve chamber is provided a valve of the puppet type which is moved away from its seat by the suction within the cylinder to admit a supply of atmospheric air thereto and upon the reverse movement of the piston is seated under the pressure from the cylinder so as to cut-off the inflow of air and cause the air under compression in the cylinder to flow therefrom. A pipe 52 is engaged in the outlet port of each cylinder head and is carried upward to a point above the cylinder to communicate with a line pipe 53. A valve chamber 54 is interposed in each pipe 52 and a puppet valve 55 is provided in each valve chamber, said valve being of the same construction as the valve 51 but being reversed relatively thereto so that it will seat under the suction in the cylinder and will be unseated under the pressure therefrom, the result being that as the piston moves away from the ports air will be drawn into the cylinder and then compressed against the inlet valve and forced out past the outlet valve into the line pipe 53. The said pipe 53 is disposed above and preferably parallel with the cylinder and interposed in its length is a T-coupling 56 in the depending branch 57 of which is engaged a nipple 58 to which is connected one end of a hose 59. The said hose 59 is coupled by any convenient form of hose coupling 60 with a second hose 61 which is connected with an elbow or pipe 62 secured in an opening in the retort or burner 63.

The retort or burner 63 is a preferably cylindrical vessel of any material which will withstand the action of the ingredients placed therein and is provided on its inner surface near its lower end with lugs or grate supports 64 upon which rests a grate or perforated plate 65. The elbow or coupling 62 is secured in the lower end of the burner or retort by a nut 66 threaded upon its extremity within the retort and bearing against the bottom of the same, as shown in Fig. 5, and over the end of the coupling 62, I arrange a baffle 67 preferably in the form of a screen secured to the bottom of the retort whereby the inflowing air will be scattered and caused to act upon and pass through the entire area of the grate 65. Near the top of the retort is an outlet 68 from which a flexible metal pipe or hose 69 extends and this pipe or hose may be of any desired length. The said pipe, of course, is provided at its free end with a nozzle 70 which is to be inserted in the runway or tunnel formed by the animals to be exterminated and then buried and packed or sealed with dirt so that no air can enter the tunnel or runway at the end in which the pipe is inserted except through the pipe. A lid 71 is provided for the retort and this lid has secured to its inner face a packing of asbestos or similar material 72 whereby, when the lid is closed, a tight joint with the retort will be effected. The lid is provided at one side with lugs 73 which depend somewhat below its edge and fit between coacting lugs 74 formed on the body of the retort, a hinge pin 75 being inserted through the several lugs so as to connect the lid to the body of the retort. At a point diametrically opposite the lugs 73, a projection or lug 76 is formed on the lid and this lug receives a pin 77 upon the ends of which links 78 are pivotally hung. The lower ends of these links 78 are pivoted, as at 79, to a locking lever 80, one arm of which constitutes a handle member and the other arm of which is adapted to engage under a locking lug 81 formed on the retort body, as clearly shown in Fig. 5. When the lever is engaged under the said lug 81 and is swung toward the retort body, the links 78 will be drawn downward so as to hold the lid 71 tight upon the body and prevent the escape of gases except through the outlet 68 and the pipe 69. The retort body is further provided exteriorly with lugs 82 through which and the upper end of a standard 83 a pivot pin or bolt 84 is inserted. The standard 83 may be of any desired construction and is secured rigidly to the base-board 1, being illustrated as having its lower end bent laterally and bolted to the base-board. This standard constitutes the sole support of the retort and permits the same to be readily inverted when it is necessary or desirable to clean it.

The operation of my device will be readily understood and it may be noted that the particular compound or spray applied to infested points by the use of my apparatus is not a part of my present invention. It may be readily used for disinfecting buildings in which animals are housed or for spraying trees or other plants, but is employed more particularly by me for forcing poisonous gas into the runways or tunnels inhabited by moles, gophers, and other obnoxious animals. In the preferred use of the machine, the chemicals or other ingredients to produce the poisonous gas are placed in the retort and are ignited, after which the cover is tightly closed, it being understood, of course, that the machine is first brought to a point where the nozzle 70 may be inserted in the tunnel into which the gas is to be forced. The tunnel having been sealed or closed around the nozzle the lever 46 is vibrated and will act through the pitman 42 to reciprocate the piston rod 22 and, of course, thereby reciprocate the piston within the cylinder 14. As the piston moves in the pump cylinder, air will be drawn into that end of the cylinder away from which the piston is moving and forced out of the cylinder from that end toward which the piston is moving and this action is reversed on the reverse movement of the piston so that a continuous flow of air into the line pipe 53 is set up. This air under pressure will pass through the coupling 56 and nipple 58 into the hose 59 and 61 and thence enter the burner through the coupling 62. Upon entering the burner, the air will at once rise through the same to the outlet 68 and will take up and carry through the said outlet into the hose or pipe 69 some of the vapor or gas within the retort. The gas so taken up will, of course, be forced into the tunnel or runway of the animals and will flow through and fill the same so that the animals will be asphyxiated and destroyed. It is desirable to form openings in the ground through the top of the tunnel before starting the operation of the machine and to employ with the gas-producing materials some ingredient which will make a pronounced smoke. When the gas is forced into the tunnel, smoke will rise through the openings formed in the ground and the operator can thus inform himself as to the progress of the gas through the tunnels. He will then, of course, know just when the work at one point has been completed and the machine should be moved to another point.

My apparatus is simple in construction, compact in arrangement and easily manipulated and efficient in use. When it is desired to clean the retort, it is necessary merely to invert the same by swinging it about the pin 84 and then unlatching the lid, whereupon the grate 65 will drop out through the open end of the retort. Of course, before attempting to invert the retort, the hose coupling 60 must be disconnected.

Having thus described the invention, what is claimed as new is:

1. An apparatus for the purpose set forth comprising a support, a retort mounted thereon for swinging movement whereby it may be inverted, a discharge tube leading from the normal upper end of the retort, and means normally connected with the bottom of the retort for effecting a continuous circulation therethrough.

2. In an apparatus for the purpose set forth, the combination of a base-board, a standard secured to and rising from the base-board, a retort pivotally secured to the upper end of the standard, a closure for the top of the retort, means normally connected with the bottom of the retort for effecting a circulation therethrough, and a discharge pipe leading from the retort.

3. In an apparatus for the purpose set forth, the combination of a support, a retort mounted thereon, a pump cylinder secured on the support, an inlet pipe on each end of the cylinder having one end open to the air, a puppet valve in each of said pipes controlling the flow therethrough into the cylinder, an outlet pipe leading from each end of the cylinder into a common pipe line, valves in said outlet pipes controlling the flow therethrough from the cylinder, a connection between the pipe line and the retort, a post in spaced relation to one end of the cylinder, a piston mounted in the cylinder, a piston rod extending from the piston through one end of the cylinder and through the said post, an operating lever, and a pitman having one end connected with the operating lever and its opposite end connected with the piston rod between the cylinder and the said post.

4. In an apparatus for the purpose set forth, the combination of a support, a retort mounted thereon, a pump cylinder operatively connected with the retort, a piston working in the cylinder, a post disposed in spaced relation to the cylinder, a piston rod extending from the piston through one end of the cylinder and through the said post, a lateral arm secured on the piston rod between the cylinder and the said post, a lever mounted at the side of the cylinder, a pitman, and clevises connecting the ends of the pitman to the lever and to the said lateral arm, respectively.

In testimony whereof I affix my signature.

JOHN EARL McLEOD. [L. S.]